United States Patent
Schmidt

(10) Patent No.: US 6,827,165 B2
(45) Date of Patent: Dec. 7, 2004

(54) ELECTRO-MECHANICAL POWERTRAIN WITH A FUEL CELL TRANSMISSION

(75) Inventor: Michael R. Schmidt, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 107 days.

(21) Appl. No.: 10/364,171

(22) Filed: Feb. 11, 2003

(65) Prior Publication Data

US 2004/0154845 A1 Aug. 12, 2004

(51) Int. Cl.[7] .............................. F16H 3/72; B60K 6/04
(52) U.S. Cl. ........................................ 180/65.2; 475/5
(58) Field of Search ........................... 180/65.2, 65.3, 180/65.6, 65.7; 475/5; 477/2, 3

(56) References Cited

U.S. PATENT DOCUMENTS

| | | | | |
|---|---|---|---|---|
| 5,558,588 A | * | 9/1996 | Schmidt | 475/5 |
| 5,571,058 A | * | 11/1996 | Schmidt | 475/5 |
| 5,603,671 A | * | 2/1997 | Schmidt | 475/5 |
| 5,713,814 A | * | 2/1998 | Hara et al. | 477/5 |
| 5,730,676 A | * | 3/1998 | Schmidt | 475/5 |
| 5,856,709 A | * | 1/1999 | Ibaraki et al. | 290/45 |
| 5,931,757 A | * | 8/1999 | Schmidt | 475/2 |
| 5,935,035 A | * | 8/1999 | Schmidt | 475/5 |
| 6,090,005 A | * | 7/2000 | Schmidt et al. | 475/5 |
| 6,358,173 B1 | * | 3/2002 | Klemen et al. | 475/5 |
| 6,524,215 B1 | * | 2/2003 | Schmidt | 477/3 |
| 6,527,659 B1 | * | 3/2003 | Klemen et al. | 475/5 |
| 6,551,208 B1 | * | 4/2003 | Holmes et al. | 475/5 |
| 6,579,201 B2 | * | 6/2003 | Bowen | 475/5 |
| 6,629,024 B2 | * | 9/2003 | Tabata et al. | 701/22 |
| 2001/0017227 A1 | * | 8/2001 | Amano et al. | 180/65.2 |
| 2002/0023790 A1 | * | 2/2002 | Hata et al. | 180/65.3 |
| 2003/0075368 A1 | * | 4/2003 | Takaoka et al. | 180/65.2 |

* cited by examiner

Primary Examiner—Christopher P. Ellis
Assistant Examiner—J. Allen Shriver
(74) Attorney, Agent, or Firm—Leslie C. Hodges

(57) ABSTRACT

An electro-mechanical powertrain includes a pair of motor/generator units that are interconnected with a transmission output shaft through planetary gear mechanisms. One of the motor/generator units continuously supplies power to a power takeoff unit, which operates accessory devices and supplies power to a transmission output shaft. The second motor/generator unit continuously transmits power to a transmission output shaft except during a ratio interchange. A selectively engageable clutch is operable to connect the first motor/generator unit with the transmission output shaft during the ratio interchange when the second motor/generator unit is disconnected therefrom. Both of the motor/generator units are supplied with power by a fuel cell prime mover through an electronic control unit.

2 Claims, 2 Drawing Sheets

ELECTRO-MECHANICAL POWERTRAIN WITH A FUEL CELL TRANSMISSION

TECHNICAL FIELD

This invention relates to powertrains and, more particularly, to powertrains including electric power transfer units and mechanical gearing.

BACKGROUND OF THE INVENTION

The advent of electric drive vehicles has given rise to a number of electromechanical power transmissions. More recently, it has been proposed to provide a fuel cell prime mover and an electro-mechanical transmission as the transmission within a vehicle powertrain.

The electromechanical transmission includes at least one electrical transfer machine, such as a motor/generator, and a source of electrical power. In many electromechanical transmissions, the source of power is an internal combustion engine, an electric power generator, again such as a motor/generator, and a battery assembly. The battery assembly, of course, adds and absorbs power during the operation of the transmission.

In a more recent proposal, the generator and internal combustion engine has been replaced with a fuel cell, such that the electro-mechanical transmission has a pure electric source of power for driving the transmission components. One such transmission can be found in U.S. Ser. No. 10/085,478 entitled "Vehicle Transmission with a Fuel Cell Power Source and a Multi-Range Transmission" and assigned to the assignee of the present invention.

SUMMARY OF THE INVENTION

It is an object of the present invention to provide an improved electromechanical powertrain having a fuel cell powered electro-mechanical transmission.

In one aspect of the present invention, the transmission employs two motor/generator units, which are supplied with electrical power from a fuel cell through an electronic control unit.

In another aspect of the present invention, a plurality of batteries is also supplied to provide power to the unit and absorb from the motor/generator units.

In yet another aspect of the present invention, a power takeoff drive mechanism is employed to operate accessories for the powertrain, such as cooling fans for the fuel cell and vehicle accessories.

In still another aspect of the present invention, one of the motor/generator units provides continuous driving power through a planetary gear arrangement to the power takeoff unit.

In yet still another aspect of the present invention, the other motor/generator unit supplies power to drive the vehicle through a separate planetary gearset.

In a further aspect of the present invention, the second power unit and planetary gearset have the output thereof controlled through a selectively engageable clutch assembly.

In a yet further aspect of the present invention, the first motor/generator unit is connectible with the transmission output shaft directly through a selectively engageable clutch mechanism.

In a still further aspect of the present invention, when the first motor/generator unit is connected to drive the output shaft directly, the second motor/generator unit and planetary gearset are shifted from a first range of operation to a second range of operation when the second motor/generator unit does not transmit power during this shift or ratio interchange.

DESCRIPTION OF AN EXEMPLARY EMBODIMENT

Figure 1:
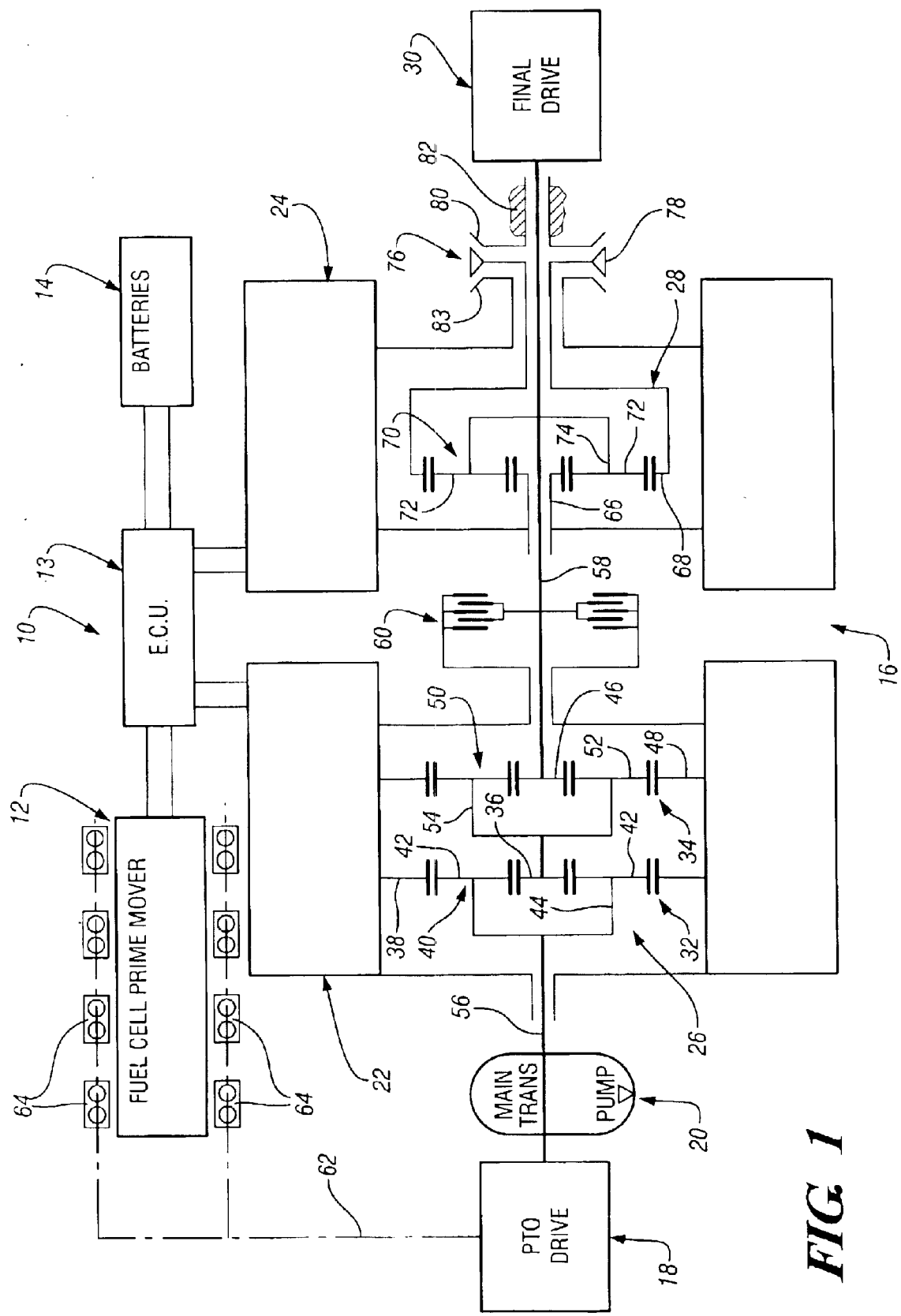
FIG. 1 is a schematic representation of a powertrain having an electro-mechanical transmission incorporating the present invention.

Referring to the drawings, FIG. 1 describes a schematic representation of a powertrain generally designated 10. The powertrain 10 includes a fuel cell prime mover 12, a battery assembly or pack 14, an electromechanical transmission 16, a power takeoff unit 18, and a hydraulic control pump 20.

The fuel cell prime mover 12 is a conventional fuel cell assembly, which as is well known converts hydrogen and oxygen to electrical power, which is then distributed to a conventional electronic control unit (ECU) 13. The ECU 13 distributes electrical power from the fuel cell prime mover 12 and the conventional battery pack 14 to the electromechanical transmission 16.

The electro-mechanical transmission 16 includes a first electrical power transfer machine or motor/generator 22, a second electric power transfer machine or motor/generator 24, a first planetary gear arrangement 26, a second planetary gear arrangement 28, and a conventional drive mechanism 30. The final drive mechanism 30 is connected in the usual manner to drive the output or drive mechanism of a vehicle in which the powertrain 10 is assembled. The motor/generator units 22 and 24 are conventional electric units, which as is well known can either deliver power or absorb power. If the electric units absorb power, that power absorption is directed by the ECU 13 to maintain the battery assembly 14 in a well-charged condition. The planetary gear arrangement 26 includes two planetary gearsets 32 and 34.

The planetary gearset 32 includes a sun gear member 36, a ring gear member 38, and a planet carrier assembly member 40. The planet carrier assembly member 40 includes a plurality of pinion gears 42 rotatably mounted on a planet carrier member 44 and disposed in meshing relationship with both the ring gear member 38 and the sun gear member 36.

The planetary gearset 34 includes a sun gear member 46, a ring gear member 48, and a planet carrier assembly member 50. The planet carrier assembly member 50 includes a plurality of pinion gears 52 rotatably mounted on a planet carrier member 54 and disposed in meshing relationship with both the sun gear member 46 and the ring gear member 48.

The planet carrier member 54 is continuously interconnected with the sun gear member 36. The ring gear members 38 and 48 are both continuously interconnected with the motor/generator unit 22. The planet carrier member 44 is continuously connected with a drive shaft 56, which is drivingly connected with both the pump 20 and the power takeoff unit 18. The sun gear member 46 is continuously connected with a transmission output shaft 58, which is drivingly connected with the final drive mechanism 30.

A conventional selectively engageable torque transmitting mechanism, such as a friction clutch 60, is disposed between the motor/generator 22 and the output shaft 58. The clutch 60 is a selectively engageable fluid-operated device of conventional design. The power or fluid to control the engagement of the clutch 60 is supplied by the control pump 20. The clutch 60 is engaged with a conventional electro-hydraulic control unit, not shown, which is a component of the ECU 13.

As is well known, the ECU 13 includes a programmable digital computer, which is effective to control the various control functions for the operation of the transmission control elements. The shaft 56, as mentioned above, also drives the power takeoff 18, which in turn has an output drive mechanism represented by the phantom line 62. The drive mechanism of the power takeoff drives a plurality of fans 64, which are disposed to provide cooling air for the fuel cell prime mover 12.

The second planetary gearset 28 includes a sun gear member 66, a ring gear member 68, and a planet carrier assembly member 70. The planet carrier assembly member 70 includes a plurality of pinion gears 72 that are rotatably mounted on a planet carrier member 74 and disposed in meshing relationship with the sun gear member 66 and the ring gear member 68. The sun gear member 66 is continuously interconnected for rotation by the motor/generator unit 24. The planet carrier member 74 is continuously drivingly connected with the output shaft 58 and therefore the final drive mechanism 30.

A conventional dual acting torque transmitting mechanism or clutch assembly 76 has an input member 78 continuously connected with the ring gear member 68. The clutch 76 has a neutral position shown wherein no drive connection is provided with the input member 78. The input member 78 is selectively movable to a position 80 wherein the ring gear member 68 is connected with a stationary housing portion 82. Thus, in this position, the clutch 76 acts as a reaction clutch or, as otherwise termed, a brake.

The input member 78 is also movable to a position 83 in which the ring gear member 68 is directly connected with the motor/generator 24 for continuous rotation thereby. Note that when the clutch 76 is in the position 83, both the sun gear member 66 and the ring gear member 68 are driven by the motor/generator 24 and therefore the planetary gearset 28 is in a 1:1 condition and the output shaft 58 is driven directly by the motor/generator 24 as is the sun gear member 46.

Figure 2:
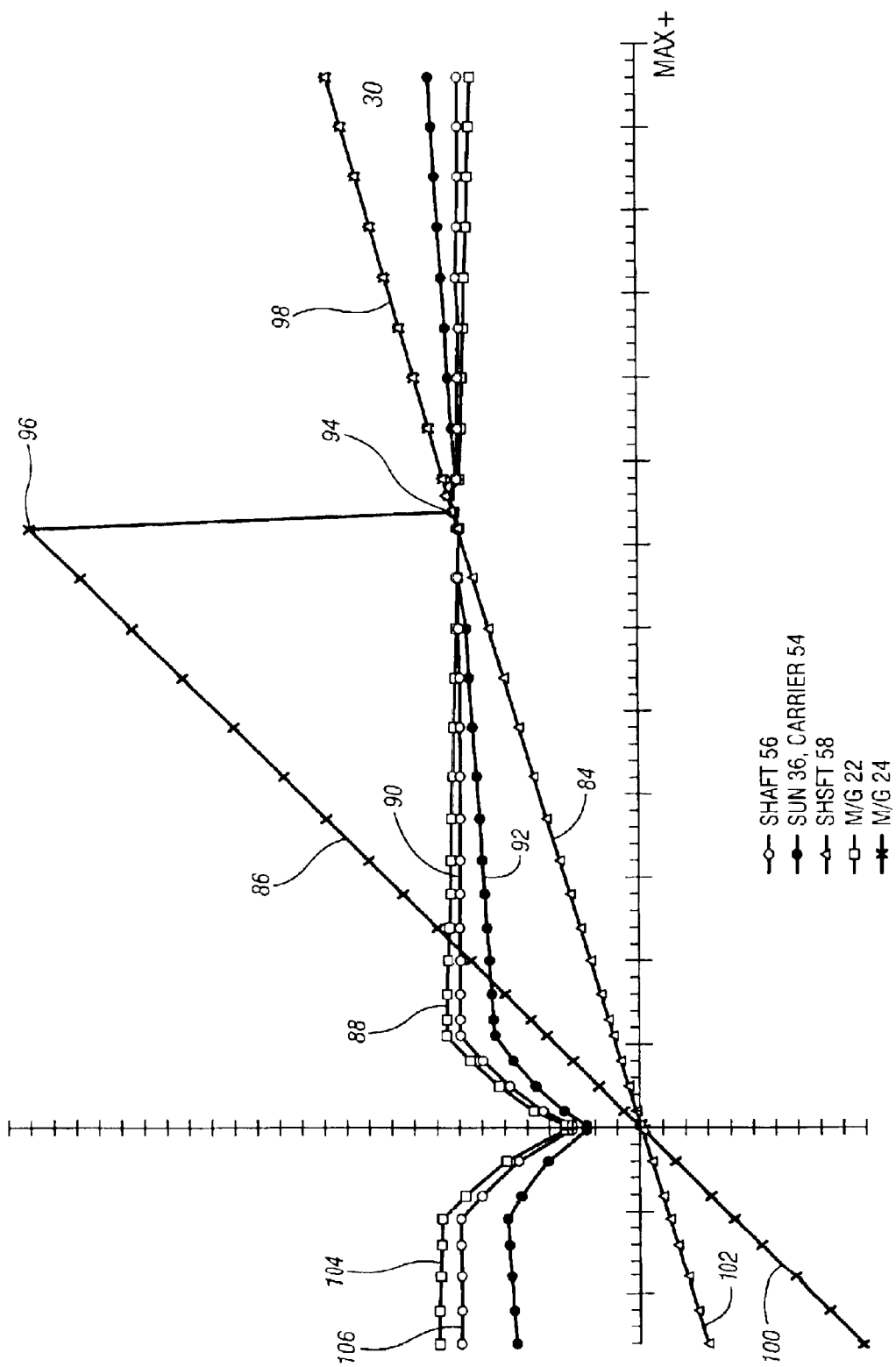
FIG. 2 is a chart describing some of the operating characterstics of the powertrain described in FIG. 1.

The transmission 16 is controlled by the ECU 13 to operate in two ranges of power transmission. These two ranges are shown in FIG. 2. During the first range of operation, the clutch 76 is disposed in the position 80 such that the planetary gearset 28 provides a reduction drive between the sun gear member 66 and the planet carrier assembly member 74. Since this directly drives the output shaft 58, the final drive mechanism 30 is operated at a speed determined by the speed of the motor/generator 24 and the gear reduction value of the planetary gearset 28.

The motor/generator unit 22, during the first range of operation provides all of the power to drive the power takeoff unit 18 and the pump 20 through the planetary gearset 32. The motor/generator 22 also provides some power to drive the output shaft 58 through the planetary gearset 34 and the sun gear member 46 thereof.

As seen in FIG. 2, the transmission output shaft 58 operates or is represented by a line 84. The motor/generator 24 operates at a speed represented by line 86. It will be recognized, by reviewing the curves or lines, that the output speed of the transmission is proportional to the speed of the motor/generator 24. The speed of the motor/generator 22 is represented by line 88, the speed of the PTO shaft 56 is represented by line 90, and the speed of the planet carrier member 54 and sun gear member 36 are represented by line 92.

Those skilled in the art will recognize that the speed of the shaft 56 is determined by the speed of the sun gear member 36 and the speed of the ring gear member 38. The speed of the sun gear member 36 is determined by the speed of the ring gear member 48 and the speed of the sun gear member 46. Thus, it is seen in the chart of FIG. 2 that the speed of shaft 56 is substantially constant while the speed of the motor/generator 22 at line 88 is steadily decreasing and the speed of the sun gear member 36 is steadily increasing. The speed of the sun gear member 36 is, of course, affected by the speed of the shaft 58, which is directly proportional to the speed of the motor/generator 24.

When the powertrain 10 reaches an operating condition that it becomes necessary to interchange the ratio from the first range to the second range, the clutch 60 is engaged, and the clutch 76 is moved to the neutral position. At this time, represented by point 94 on the chart of FIG. 2, all of the driving power for the output shaft 58 as well as the power takeoff unit 18 and pump 20 is provided by the motor/generator 22. Note that at this time all of the units rotate in unison.

The engagement of the clutch 60 causes the planetary gearsets 32 and 34 to operate as a single unit, and the output shaft 58 is, of course, as previously described, connected directly with the motor/generator 22. Thus, the power output of the motor/generator 22 increases significantly during this ratio interchange. Also, during the ratio interchange, the motor/generator 24 is unpowered and decreased in speed from point 96 to point 94. In this speed relationship, the input member 78 is operating in unison or at the same speed as the speed of the motor/generator 24 and can therefore be synchronously engaged. Once the clutch 76 is engaged in the position 83, the clutch 60 is released and the speed of the transmission output shaft 58 and the speed of the motor/generator 24 proceed along line 98.

It can be seen that after the shift point, the speed of the sun gear member 36 continues to increase, the speed of the motor/generator 22 continues to decrease, and the speed of the power takeoff unit 18 continues at a constant speed. As described above, the speed of the sun gear member 36 is proportional to the speed of the motor/generator 24 as represented by the speed of the output shaft 58.

During the range interchange, the motor/generator 24 can be operated as a generator, which will assist the slowing of the speed of the motor/generator 24. It is considered that the ratio interchange from first range to second range will occur in approximately five seconds. During this time, the motor/generator 22 is supplying all of the power to operate both the vehicle and the power required for the drive shaft 56.

Also as seen in FIG. 2, the powertrain can operate in both forward and reverse directions. The reverse operation is provided by rotating the motor/generator 24 in the reverse or negative direction as shown by line 100, such that the transmission output shaft 58 will also rotate in the reverse direction as shown by line 102. The motor/generator 22 will operate at a slightly higher speed as represented by line 104. This is due to the fact that during the reverse operation, the sun gear member 46 is operated in a reverse direction along with the transmission output shaft 58, thus requiring a higher positive input speed from the ring gear members 48 and 38 to provide the constant speed of the power takeoff unit 18 as represented by line 106.

The above description represents the preferred embodiment of the power transmission and the associated gearing. The planetary gearing, of course, can be manipulated and changed to provide for various speed ranges as desired. It is also possible to employ a fixed planetary reduction unit between the output of the clutch 60 and the input to the shaft 58. This simply changes the speed ratios between the sun gear member 46 and the shaft 58.

In the embodiment shown, all of the ring gear members 38, 48, and 68 have the same number of teeth and all of the sun gear members 36, 46, and 66 have the same number of teeth. To provide the curves or lines shown in FIG. 2, the ring gear/sun gear tooth ratio is equal to 2.405. To provide the proper speed relationship between the vehicle speed and the transmission output speed, the final drive mechanism 30 has a ratio of 6.2 and the vehicle wheels have a rolling radius of nineteen inches.

The curves represented in FIG. 2 are full power curves. That is, the fuel cell is supplying the maximum power to operate the vehicle as well as the load on the power takeoff unit 18 and the pump 20. In the example shown, the fuel cell has a maximum rating of 315 horsepower and the battery assembly 14 can supply and absorb seventy horsepower. The power takeoff unit 18 has a capacity of 125 horsepower, which is employed to drive not only the cooling fans but also other accessories for the vehicle such as air conditioning and perhaps power steering and power braking. The pump 20 has a maximum horsepower absorption of approximately six horsepower. The output of the pump 20 is employed in providing cooling lubrication for the transmission components, such as the planetary gearsets as well as cooling for the clutches and power for the engagement and disengagement control of the clutches.

What is claimed is:

1. An electro-mechanical powertrain including a transmission comprising:
    a fuel cell power source;
    battery means;
    an electronic control unit connected between said fuel cell power source and said battery means;
    a transmission output shaft;
    a first electric power transfer machine electrically connected with both said fuel cell power source and said battery means through said electronic control unit;
    a second electric power transfer machine electrically connected with both said fuel cell power source and said battery means through said electronic control unit;
    a power takeoff means for supplying power to operate accessories of said powertrain;
    a first planetary gearset having at least a first member continuously connected with said first electric power transfer machine, a second member continuously connected with said power takeoff means, and a third member continuously connected with said output shaft;
    a second planetary gearset having a first member continuously connected with said second electric power transfer machine, a second member continuously connected with said output shaft, and a third member;
    a first torque-transmitting mechanism for selectively connecting said third member of said second planetary gearset with a stationary member of the transmission;
    a second torque-transmitting mechanism for selectively connecting said third member of said second planetary gearset with said second electric power transfer machine; and
    a third torque-transmitting mechanism for selectively connecting said first electric power transfer machine with said output shaft to power said output shaft and said power takeoff means when said powertrain is changed from a first range to a second range of operation and said second electric power transfer machine is not transmitting power to said output shaft.

2. An electromechanical powertrain including a transmission comprising:
    a fuel cell power source;
    a battery assembly;
    an electronic control unit connected between said fuel cell power source and said battery assembly for controlling power transmission therefrom;
    a transmission output shaft;
    a power takeoff unit for directing power to a plurality of accessories;
    a first electric power transfer machine;
    a second electric power transfer machine;
    first planetary gear means for transmitting power continuously from said first electric power transfer machine to said power takeoff unit;
    a first selectively operable torque-transmitting mechanism having a first engaged position, a second engaged position, and a nonengaged position;
    second planetary gear means continuously connected with said second electric power transfer machine and said first selectively operable torque-transmitting mechanism for transmitting power to said output shaft at a first ratio when said first engaged position is selected, at a second ratio when said second engaged position is selected, and disconnect said electric power transfer machine from said output shaft; and
    a second selectively engageable torque-transmitting mechanism being selectively engageable between said first electric power transfer machine and said output shaft to transmit power therebetween when said first torque-transmitting mechanism is in said nonengaged position.

* * * * *